2,805,941
METHOD FOR RECOVERING PLATINUM

Elton B. Tucker, Highland, Ind., assignor to Standard Oil Company, Chicago, Ill., a corporation of Indiana No Drawing. Application March 25, 1955, Serial No. 496,933

8 Claims. (Cl. 75—121)

The present invention relates to platinum recovery; more particularly it relates to recovery of platinum from platinum-alumina composites, such as platinum-on-alumina hydroforming catalysts.

In upgrading the octane number of petroleum naphthas by hydroforming, it has been found that use of platinum-on-alumina catalysts, in contrast with conventional hydroforming catalysts, such as molybdena-on-alumina catalyst, results in substantially higher yields and thereby greater economy of operation. Within a recent five-year period over a million barrels of hydroforming capacity using platinum-on-alumina catalyst have been installed. Cost of platinum-on-alumina catalyst, however, is as much as ten to twenty times that of conventional hydroforming catalysts. The high cost arises from the fact that the catalyst contains up to one percent platinum, an extremely expensive material. Recovery of this platinum from used or spent platinum-on-alumina catalyst substantially reduces the cost of platinum hydroforming and makes the process far more economically feasible.

Current techniques for recovering platinum from platinum-on-alumina catalyst require that both the alumina, which makes up about 99 percent of the catalyst, as well as the platinum, be taken into solution. Large quantities of reagents are therefore necessary, as well as a complex recovery process. I have now discovered a new technique, involving calcining spent catalyst at high temperature prior to platinum recovery, whereby all of the alumina is converted into a form insoluble in acids. This technique obviates the necessity for taking alumina into solution and thus greatly reduces the amount and concentration of reagents. It is therefore an object of my invention to provide a simplified procedure for recovering platinum from platinum-on-alumina catalyst. Another object of my invention is to reduce the quantities of reagents which are required. Still another object is to reduce the strength of reagents which are necessary. Other objects of my invention will be apparent from the following description and claims:

In accordance with my invention, the platinum-alumina composite from which platinum is to be recovered is calcined at a temperature above about 2000° F. and below the melting point of alumina, e. g. about 3700° F., preferably above about 2300° F. and below about 2900° F., for a time sufficient to convert the alumina into insoluble form. Such treatment also appears to destroy any adsorptive power of alumina for platinum. The time required to effect this transformation is a function of calcination temperature—longer periods being required at the lower temperatures. This time is usually above about 0.1 hour, preferably 0.1 to 10 hours. The calcined composite is cooled, suitably below the boiling point of aqua regia, and contacted with aqua regia, suitably in a concentration above about 25 percent, and preferably around 50 percent, whereby platinum is selectively dissolved from the alumina. The resulting platinum solution is separated from the alumina by conventional techniques, such as filtration or centrifuging, and platinum is recovered from the solution by any of several methods known in the art.

Some platinum-on-alumina catalysts contain a small amount of halogen, usually less than about one percent by weight. This halogen may have been incorporated during preparation of the catalyst or may have been picked up during hydroforming operations. With such catalysts, a preliminary heating or preheating at 1100–1600° F., preferably 1200–1500° F., for a period of 0.1 to 10 hours, preferably 0.1 to 4 hours, before the high-temperature calcination of my invention has been found desirable. This preliminary heating maximizes subsequent platinum recovery. Still higher platinum recoveries may be obtained if the catalyst is cooled between the preliminary heating and calcination, e. g. below about 800° F., preferably to ordinary or ambient temperatures. I am not certain as to the mechanism whereby such pretreatment operates to improve platinum recovery. It is possible, however, that if the catalyst is heated directly to above about 2000–2300° F. without a preliminary heating, some platinum is lost, probably as volatilized platinum halide.

Platinum-alumina catalyst can be prepared in many ways. In one such way, the platinum solution is sulfided with aqueous ammonium sulfide as described in Heard et al. U. S. Patent 2,659,701 (November 17, 1953), commingled with an alumina hydrosol prepared as described in Heard Reissue 22,196 (October 6, 1942), gelled, and calcined at about 1100° F. Platinum-alumina catalyst prepared in such a manner contains alumina in what is known as the gamma form.

Nomenclature for the various types of aluminas is somewhat confused. A recent publication by the Aluminum Company of America (Technical Paper No. 10, "Alumina Properties," by Allen S. Russell, 1953) removes much of the confusion from this terminology. For purposes of this invention, all types of aluminas will be classified in either of two classifications, that is, alpha alumina or gamma-type aluminas. Alpha alumina is defined as that form of alumina which results from solidification of an alumina melt or from a high-temperature calcination of the other aluminas. The other aluminas are all termed gamma-type aluminas. Gamma-type aluminas thus include the gamma, delta, eta, theta, kappa, and chi aluminas as described in the said Alcoa paper.

Gamma-type aluminas are considered the desired or active form of alumina for use in platinum hydroforming catalysts. One process employing platinum on a gamma-type alumina is Ultraforming, described in "The Petroleum Engineer," vol. 26, No. 4, April, 1954, page C–35. Gamma-type aluminas can be substantially completely converted to alpha alumina by calcination at temperatures above about 2000–2300° F. Some transformation from gamma-type to alpha can take place at lower temperatures, but in the temperature range normally encountered in hydroforming and catalyst regeneration, e. g. 800–1200° F., substantially all of the alumina remains as gamma-type alumina.

In my invention, I take advantage of this property of alumina which permits its conversion from gamma-type to the alpha form. Gamma-type aluminas are substantially completely soluble in aqua regia, while alpha alumina is substantially completely insoluble. Furthermore, alpha alumina as produced under my calcination conditions appears to retain little or no ability to adsorb or otherwise hold platinum when contacted with aqua regia. Thus, by converting all of the alumina to the insoluble alpha form, platinum can be removed by the simple step of dissolving it in aqua regia without having to take alumina into solution also. The enormous advantage of not having to dissolve alumina to recover platinum can be appreciated when it is realized that alumina make up about 99 percent of the total weight of the catalyst. This and other advantages will become readily apparent by considering methods previously known in the art for recovering platinum.

In one of the conventional methods for recovering platinum, spent catalyst is first treated with a reagent, such as sulfuric acid, which dissolves gamma-type aluminas. Platinum is then separated from the residue by dissolving the platinum in aqua regia. Platinum is recovered from the resulting solution and purified by any of several methods known in the art. This method suffers from the fact that large quantities of sulfuric acid are required to dissolve away the alumina and thus concentrate platinum. In addition, some platinum, in the form of platinum sulfide, is dissolved by the sulfuric acid. Thus, additional processing steps are required in order to recover this platinum.

Another way for recovering platinum from platinum-alumina catalyst is to dissolve both the platinum and the alumina in concentrated aqua regia. Platinum is then recovered from the aqua regia by techniques known in the art. Again, this technique suffers from the inherent disability of requiring very large quantities of reagent for dissolving both alumina and platinum. In addition, concentrated aqua regia (3 parts of 12 Normal HCl, 1 part of 15.7 Normal $HNO_3$) is required to dissolve the entire catalyst; while, if only platinum is to be dissolved, 25 percent aqua regia (1 part concentrated aqua regia, 3 parts water) is satisfactory.

Thus, essentially complete conversion of alumina to the insoluble alpha form, as practiced in my invention, simplifies platinum recovery, vastly reduces the quantities of reagents required, and decreases the concentration of aqua regia necessary. After calcination above about 2000–2300° F., the spent catalyst is simply treated with the dilute aqua regia to leach out platinum. Platinum is recovered from the aqua regia by techniques known in the art.

There are several techniques for recovering platinum after it is dissolved in aqua regia. One method which involves repeated recrystallizations as ammonium chloroplatinate is described by Wicker, Gilchrist, and Swanger in their article "Purification of the Six Platinum Metals" (Transactions, The American Institute of Mining and Metallurgical Engineering, 76 (1928)). Another method is to precipitate the platinum as platinum sulfide and then to ignite the platinum sulfide at 1400° to 1800° F. to convert platinum sulfide to the metal. Other methods are described in the art.

In a preferred embodiment of my invention, a platinum-on-alumina hydroforming catalyst is heated to 1400° F. for two hours and cooled to ordinary room temperatures. The catalyst is then calcined at 2600° F. for one hour to convert gamma-type aluminas to alpha alumina. The calcined catalyst is cooled and is then heated in a 50 percent solution of aqua regia at just below the boiling point for two hours or until all of the platinum is dissolved. The insoluble alpha alumina is removed by filtering and washed with dilute aqua regia to complete the removal of the platinum salt. The aqua regia solution of platinum is then dried and taken up repeatedly with dilute HCl in order to remove nitric acid. After being taken up in HCl about four times, a small amount of technical-grade formic acid is added to eliminate the nitric acid completely. The resulting chloroplatinic acid is then sulfided by bubbling $H_2S$ through it at just below the boiling point for 15 to 20 minutes. Platinum sulfide is filtered and is heated to 1400–1800° F. for one hour to convert platinum sulfide to the metal.

This invention has been described with specific reference to used or spent platinum-on-alumina catalyst. It is equally applicable to fresh platinum-on-alumina catalyst which is being disposed of for one reason or another, such as off-specification activity, contamination, etc. It is also applicable to any platinum-alumina composites containing alumina in the gamma form.

My invention will be more fully understood from the following specific examples.

*Example 1*

Ten-gram samples of 0.6 percent platinum-on-gamma-alumina hydroforming catalyst were heated to 2600° F. for one hour, cooled, and leached with 100 ml. of 50 percent aqua regia at just below the boiling point for several hours in a covered beaker. The beakers and contents were cooled slightly, 100 ml. of cold water added, and the undissolved residues filtered from the solution and washed on the filter. Examination of the residue showed that virtually none of the alumina had gone into solution. The residues were also examined quantitatively for platinum by: (a) examination with the emission spectrograph; (b) releaching with dilute aqua regia and testing the solution; (c) fusing with $Na_2CO_3$, and also with $NaHSO_4$, dissolving the fused masses in water and testing the solutions. The amount of platinum, if any, in the residues was less than the limits of detection by these means, which limits are estimated to be below 1 p. p. m. The recovered platinum corresponded to more than 99 percent of the platinum originally present in the catalyst.

*Example 2*

Aliquot portions of platinum-on-gamma-alumina hydroforming catalyst containing approximately 0.5 percent of chloride were heated and calcined in several ways to determine the effect of the presence of chloride on platinum recovery. In the first procedure, aliquots of the catalyst were ignited directly to temperatures ranging from 2000° F. to 2800° F. for one to four hours before leaching of the platinum with 50 percent aqua regia. In the second, aliquots were preheated to 1400° F. for two hours and then immediately raised to 2300° F. for two hours before leaching with aqua regia. In the third, aliquots were first preheated to 1400° F. for two hours, then cooled to room temperature, and then reheated to 2300° F. for two hours, before leaching with 50 percent aqua regia. Platinum contents of the solutions were then determined by the differential colorimetric technique using a Beckmann DU Spectrophotometer at 403 millimicrons wave length.

In preparing the samples for these determinations, the aqua regia solutions of platinum were converted to chloroplatinic acid by repeated drying of the solution to wet salts and then taking them up in HCl. A reducing agent, formic acid, was also added to convert nitrates to oxides of nitrogen, which were removed as gases. A 20 percent solution of stannous chloride was then added to the chloroplatinic acid to develop color for the differential color determinations.

The platinum recoveries obtained by these high-temperature calcinations to convert gamma-type to alpha alumina were then compared with three other conventional techniques for recovering platinum, all of which involved the cumbersome, lengthy, and expensive step of dissolving both the gamma alumina and platinum in concentrated aqua regia. The results are as follows:

| | Number of Determinations | Avg. Pt. Recovered, Wt. Percent of Catalyst |
|---|---|---|
| Methods in which gamma alumina was first converted to insoluble alpha alumina: | | |
| (a) Immediate calcination at 2,000–2,800° F | 8 | 0.579 |
| (b) Preheating at 1,400° F. and then calcination at 2,300° F | 3 | 0.598 |
| (c) Preheating at 1,400° F., cooling to room temperature, and then calcination at 2,300° F | 3 | 0.603 |
| Conventional complete leaching of both Pt. and gamma alumina | 3 | 0.602 |

These data illustrate the need for preheating to obtain extremely high platinum recoveries when chloride is present in platinum-alumina catalyst. They also vividly illustrate the fact that the greatly simplified platinum recovery method herein described gives results as good as those obtained with more cumbersome, lengthy, and expensive conventional techniques.

While I have described my invention with reference to certain specific embodiments, it is to be understood that such embodiments are illustrative only and not by way of limitation. Numerous additional embodiments of the invention, alternative procedures, techniques, materials, and operating conditions will be apparent from the foregoing description to those skilled in the art.

In accordance with the foregoing description, I claim as my invention:

1. The method of recovering platinum from a platinum-alumina composite containing a substantial proportion of gamma-type aluminas, which comprises in combination the steps of calcining said composite at a temperature above about 2000° F. for a time sufficient to convert said gamma-type aluminas substantially completely into alpha alumina, cooling the treated composite, contacting the treated composite with aqua regia, whereby platinum is selectively dissolved from said alpha alumina, separating the resulting platinum solution from said alpha alumina, and recovering platinum from said solution.

2. The method of claim 1 in which said composite is calcined at a temperature above about 2000° F. and below about 3700° F. for a period of about 0.1 to 10 hours.

3. The method of recovering platinum from platinum-alumina composite containing a substantial proportion of gamma-type aluminas, which comprises in combination the steps of calcining said composite at a temperature above about 2300° F. and below about 2900° F. for a period of about 0.1 to 10 hours, whereby said gamma-type aluminas are substantially completely converted into alpha alumina, cooling the treated composite, contacting the treated composite with above about 25 percent aqua regia, whereby paltinum is selectively dissolved from said alpha alumina, separating the resulting platinum solution from said alpha alumina, and recovering platinum from said solution.

4. The method of recovering platinum from halide-containing platinum-alumina composite in which a substantial proportion of the aluminas are of the gamma type, which comprises in combination the steps of preheating said composite at a temperature in the range of about 1100 to 1600° F. for a period of about 0.1 to 10 hours, calcining the preheated composite at a temperature above about 2000° F. for a time sufficient to convert said gamma-type aluminas substantially completely into alpha alumina, cooling the treated composite, contacting, the treated composite with aqua regia, whereby platinum is selectively dissolved from said alpha alumina, separating the resulting platinum solution from said alpha alumina, and recovering platinum from said solution.

5. The method of recovering platinum from halide-containing platinum-alumina composite in which a substantial proportion of the aluminas are of the gamma type, which comprises in combination the steps of preheating said composite at a temperature in the range of about 1200 to 1500° F. for a period of about 0.1 to 4 hours, calcining the preheated composite at a temperature above about 2300° F. and below about 2900° F. for a period of about 0.1 to 10 hours, whereby said gamma-type aluminas are substantially completely converted into alpha alumina, cooling the treated composite, contacting the treated composite with above about 25 percent aqua regia, whereby platinum is selectively dissolved from said alpha alumina, separating the resulting platinum solution from said alpha alumina, and recovering platinum from said solution.

6. The method of recovering platinum from halide-containing platinum-alumina composite in which a substantial proportion of the aluminas are of the gamma type, which comprises in combination the steps of preheating said composite at a temperature in the range of about 1100° F. to 1600° F. for a period of about 0.1 to 10 hours, cooling said composite to a temperature below about 800° F., calcining said composite at a temperature above about 2000° F. for a time sufficient to convert said gamma-type aluminas substantially completely into alpha alumina, cooling the treated composite, contacting the treated composite with aqua regia, whereby platinum is selectively dissolved from said alpha alumina, separating the resulting platinum solution from said alpha alumina, and recovering platinum from said solution.

7. The method of recovering platinum from halide-containing platinum-alumina composite in which a substantial proportion of the aluminas are of the gamma type, which comprises in combination the steps of preheating said composite at a temperature in the range of about 1200° F. to 1500° F. for a period of about 0.1 to 4 hours, cooling the preheated composite to a temperature below about 800° F., calcining said composite at a temperature above about 2300° F. and below about 2900° F. for a period of about 0.1 to 4 hours, whereby said gamma-type aluminas are substantially completely converted into alpha alumina, cooling the treated composite, contacting the treated composite with above about 25 percent aqua regia, whereby platinum is selectively dissolved from said alpha alumina, separating the resulting platinum solution from said alpha alumina, and recovering platinum from said solution.

8. The method of recovering platinum from halide-containing platinum-alumina composite in which a substantial proportion of the aluminas are of the gamma type, which comprises in combination the steps of preheating said composite at a temperature around 1400° F. for about two hours, cooling said composite to ordinary temperatures, calcining said composite at a temperature of about 2600° F. for a period of about one hour, whereby said gamma-type aluminas are substantially completely converted into alpha alumina, cooling the treated composite to a temperature below the boiling point of aqua regia, contacting the treated composite with about 50 percent aqua regia, whereby platinum is selectively dissolved from said alpha alumina, separating the resulting platinum solution from said alpha alumina, and recovering platinum from said solution.

References Cited in the file of this patent

UNITED STATES PATENTS

| | | |
|---|---|---|
| 2,635,080 | Appell | Apr. 14, 1953 |
| 2,710,799 | Leopard | June 14, 1955 |